United States Patent
Gaeta et al.

(10) Patent No.: US 10,002,639 B1
(45) Date of Patent: Jun. 19, 2018

(54) SANITIZATION OF VOICE RECORDS

(71) Applicant: United Services Automobile Association (USAA), San Antonio, TX (US)

(72) Inventors: Michael Joseph Gaeta, San Antonio, TX (US); Michael Jay Szentes, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days. days.

(21) Appl. No.: 15/620,044

(22) Filed: Jun. 12, 2017

Related U.S. Application Data (60) Provisional application No. 62/352,290, filed on Jun. 20, 2016.

(51) Int. Cl.
| | |
|---|---|
| *G11B 5/00* | (2006.01) |
| *G11B 27/031* | (2006.01) |
| *G10L 15/02* | (2006.01) |
| *G06F 21/60* | (2013.01) |
| *G10L 15/16* | (2006.01) |
| *G10L 15/14* | (2006.01) |

(52) U.S. Cl.
CPC .......... *G11B 27/031* (2013.01); *G06F 21/60* (2013.01); *G10L 15/02* (2013.01); *G10L 15/142* (2013.01); *G10L 15/16* (2013.01)

(58) Field of Classification Search
CPC .......... G11B 2220/90; G11B 20/10527; G11B 27/032; G11B 5/012; G11B 27/36; G11B 27/034; G10L 15/22; G10L 15/265; G06F 17/289; H04M 2201/40; H04M 3/493; G08B 13/19669; G08B 13/28; H04N 7/1675; H04N 21/23475; H04N 21/26606

USPC ....... 360/5, 8, 13, 31; 704/275, 278, 251, 7; 379/88.01, 88.02, 88.03, 88.04; 380/200

See application file for complete search history.

(56) References Cited

U.S. PATENT DOCUMENTS

2013/0266127 A1* 10/2013 Schachter ............... G10L 25/48
379/88.01

FOREIGN PATENT DOCUMENTS

GB 2478916 A * 9/2011 ............. H04M 3/42

OTHER PUBLICATIONS

IBM "IBM Technology to Protect Customer Data in the Call Center Industry" Published Jul. 3, 2008 pp. 1-3.*

* cited by examiner

*Primary Examiner* — Nabil Hindi
(74) *Attorney, Agent, or Firm* — Fish & Richardson P.C.

(57) ABSTRACT

Methods, systems, and apparatus, including computer programs encoded on computer storage media, for sanitizing audio recordings. One of the methods includes identifying confidential information in a transcription of an audio file. The method includes altering at least a portion of the audio file to remove the identified confidential information.

12 Claims, 5 Drawing Sheets

SANITIZATION OF VOICE RECORDS

CROSS-REFERENCE TO RELATED APPLICATION

This application claims priority to U.S. Application Ser. No. 62/352,290, filed on Jun. 20, 2016, the entire contents of which is incorporated by reference into the present disclosure.

BACKGROUND

Speech recognition is a sub-field of computer linguistics which incorporates knowledge and research in the linguistics, computer science, and electrical engineering fields to enable the recognition and translation of spoken language into text. Some customer service calls may be recorded and automatically transcribed using speech recognition technologies.

SUMMARY

This specification describes technologies relating to data security.

In general, one innovative aspect of the subject matter described in this specification can be embodied in methods that include the actions of identifying confidential information in a transcription of an audio file. The method includes the actions of altering at least a portion of the audio file to remove the identified confidential information.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. The methods may include the actions of transcribing the audio file. Identifying the confidential information may include applying at least one regular expression to the transcription. Altering at least a portion of the audio file may include removing the confidential information from the audio file. Altering at least a portion of the audio file may include identifying a type of confidential information in the audio file, obtaining an audio cue associated with the type of confidential information, and inserting the audio cue into the audio file.

Particular embodiments of the subject matter described in this specification can be implemented so as to realize one or more of the following advantages. Customer privacy can be improved. Training data can be efficiently generated.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

When a customer or other individual calls a company or other institution, the customer may reveal confidential personal information about themselves. Some of the calls may be recorded. These recordings include the confidential personal information and therefore are difficult to use for other purposes. For example, calls to customer service centers may be recorded for training purposes; however, the company may wish to protect the confidential personal information of the customer.

Confidential personal information can include information such as a customer's name, a customer's address, a customer's telephone number, a customer's account numbers, a customer's government issued identification number, etc. Other types of confidential personal information include email addresses, passport numbers, IP address, vehicle registration plate numbers, driver's license numbers, credit card numbers, digital identity, birthdates, birthplaces, login names, screen names, nicknames, and answers to security questions.

Figure 1:
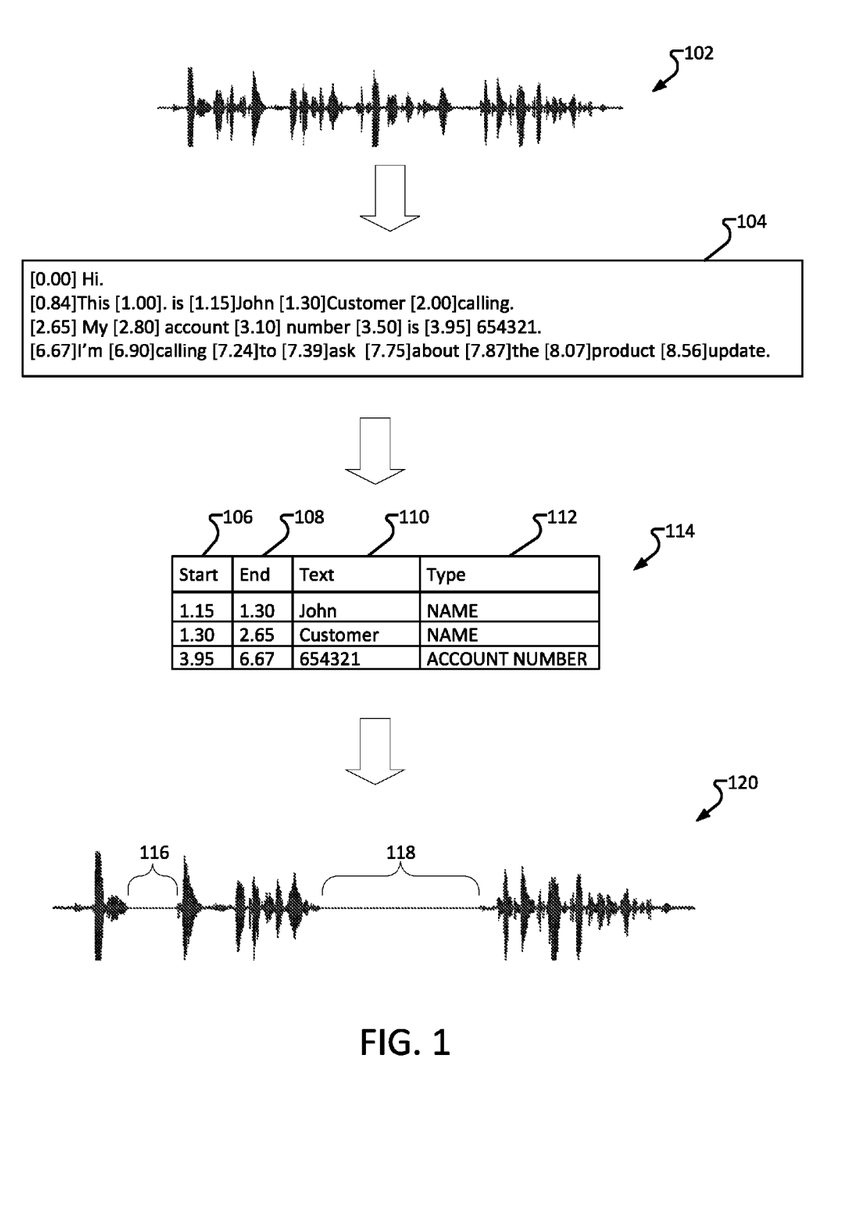
FIG. 1 illustrates an example of removing confidential personal information from a voice recording.

A system can identify confidential personal information in a voice recording and may remove or alter that confidential personal information. FIG. 1 illustrates an example of removing confidential personal information from a voice recording 102. A voice recording 102 may be transcribed to text 104 using speech recognition software or a speech recognition component integrated into a software system. In this example, a customer calls and provides their name and account number along with other non-personal information.

Voice recordings can include recordings in various data formats including, but not limited to, MP3, WAV, AIFF, FLAC, OGG, and ACC files. Generally, audio is recorded using an audio codec. An audio codec is a device or computer program capable of coding or decoding a data stream of audio.

Video recordings that include an audio track may be processed in a similar manner.

The speech recognition component generates a transcription of the voice recording 102. The transcription includes time offsets identifying where each word in the voice recording 102 begins. In some implementations the transcription can include additional information, for example, a time in which each word ends.

A confidential information identification service can analyze the text 104 to identify confidential personal information. For example, the confidential information identification service can use regular expressions, dictionaries, and artificial intelligence components to identify personal information. In this example, the confidential information identification service generates a table 114 that lists each identified piece of confidential personal information. The table 114 includes a start time 106, an end time 108, the text 110 that was identified as confidential, and an indication of the type 112 of the confidential information identified.

A recording alteration system or component can remove or alter the portions of the voice recording that contain the confidential private information. For example, the updated voice recording 120 has had the confidential personal information removed and replaced with silence. The section 116 of the updated voice recording 120 replaces the customer's name. The section 118 of the updated voice recording 120 replaces the account number.

Figure 2:
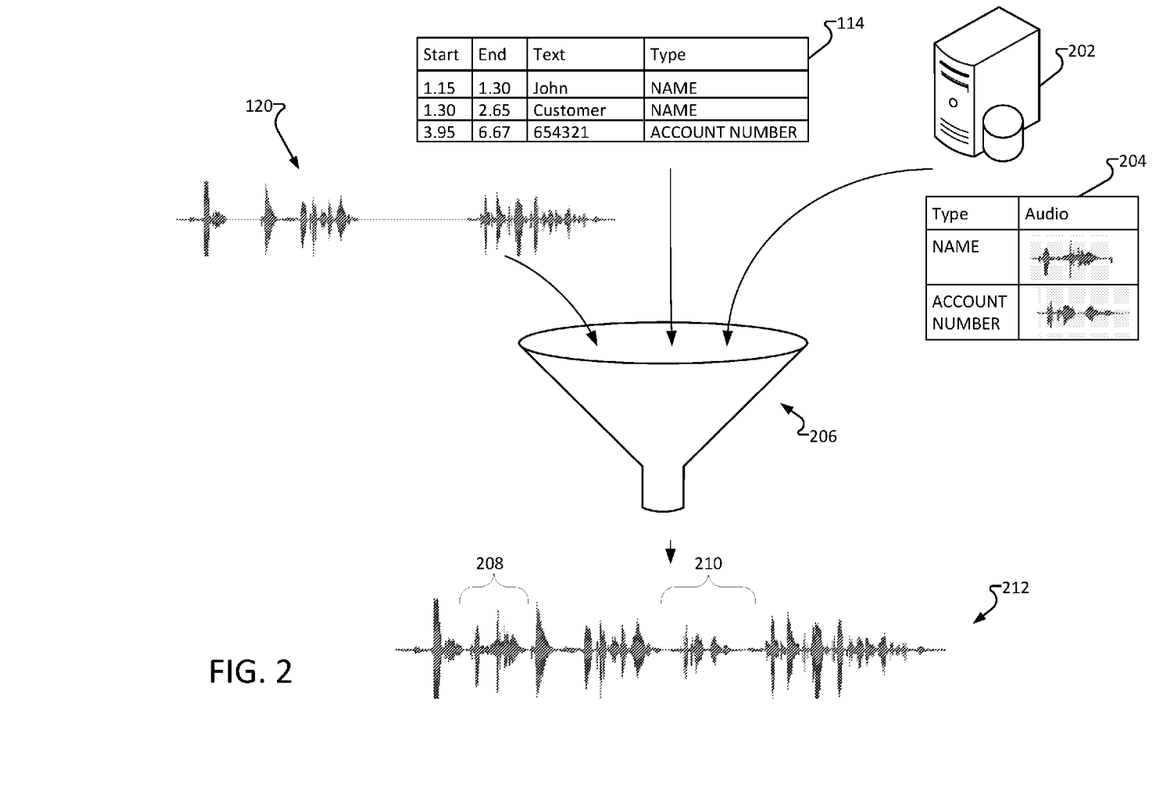
FIG. 2 illustrates an example of inserting alternative sound elements into a voice recording in order to provide some context as to the type of confidential personal information that was removed.

FIG. 2 illustrates an example of inserting alternative sound elements into a voice recording in order to provide some context as to the type of confidential personal information that was removed.

Each type of confidential personal information may be associated with a sound recording 204 stored on a computer system 202. For example, the "name" type of confidential information may be associated with a sound recording of a user saying "name." The "account number" confidential information type may be associated with a sound recording of a user saying "account number." In some implementations, the sound recording may be automatically generated using synthetic speech technologies.

The updated voice recording 120 (or alternatively the voice recording 102 of FIG. 1), the table 114, and the voice recordings 204 can be provided to a recording alteration system (represented by the funnel 206) to generate a new sound recording 212 (or alter the prior sound recording), that replaces the confidential private information with the voice recording indicating that a customer's name was replaced 208 and the voice recording indicating that a customer's account number was replaced 210.

Figure 3:
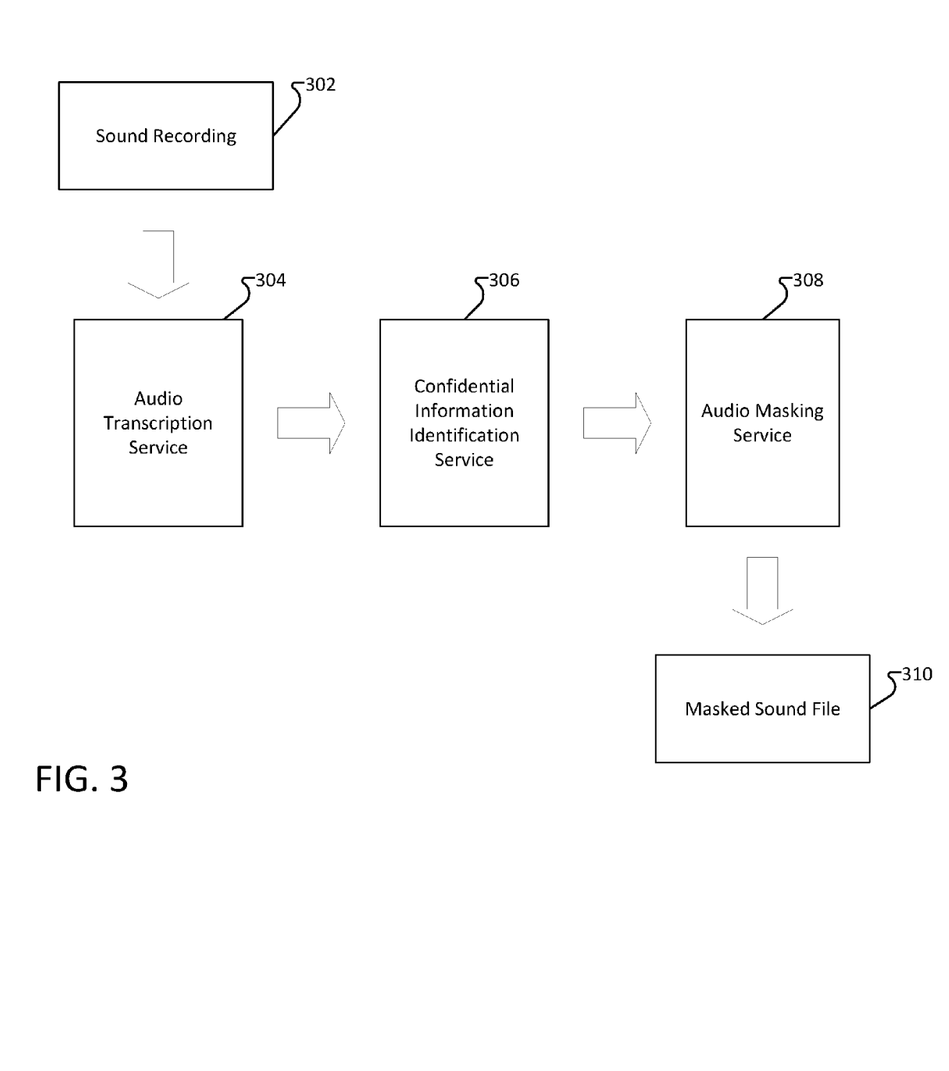
FIG. 3 illustrates and example of the process steps that can be used to sanitize a sound recording.

FIG. 3 illustrates an example of the process steps that can be used to sanitize a sound recording. A sound recording 302 is provided to an audio transcription service 304. The audio transcription software performs the conversion of human speech into a text transcript. The audio transcription service may use natural language speech recognition. The audio transcription service may use acoustic models and language models to statistically analyze the sound recording and identify likely words. For example, the audio transcription service may use Hidden Markov models (statistical models that output a sequence of symbols or quantities. Hidden Markov models can be used in speech recognition because a speech signal can be viewed as a piecewise stationary signal or a short-time stationary signal.).

In some implementations, the audio transcription service may include a neural network or another artificial intelligence system that may be trained using transcriptions from past voice recordings made from a similar context (for example, to sanitize customer service calls, the audio transcription service may be trained using transcripts of past customer service calls.). In general, creating a model for the audio transcription service using a similar context can reduce the error rate associated with the transcription process.

The transcribed audio text can be provided to a confidential information identification service 306. The confidential information identification service 306 may identify confidential information in the transcribed text. The confidential information may be found using a variety of different techniques, including but not limited to, the use of regular expressions, dictionaries, and machine learning. As used herein, a regular expression is a sequence of characters that define a search pattern, mainly for use in pattern matching with strings, or string matching. For example, a regular expression '9999' may be used to match any four digit number. In this manner, regular expressions can identify telephone numbers, credit card numbers, addresses, etc. Words matching the regular expression may be flagged as potential confidential information.

The confidential information identification service 306 may identify words that are not in a dictionary of predetermined non-confidential terms (e.g., proper names may be excluded from the dictionary). Words that are not located in the dictionary may be flagged as potential confidential information. In some implementations, the dictionary may be used with a grammar analysis to determine the likelihood that the words are confidential.

Machine learning techniques can be used to identify potential confidential information. Training sets including transcriptions of telephone calls and the confidential information in those calls may be provided as a training set to a machine learning algorithm. The machine learning algorithm may infer a function from the training set (including the transcription and the confidential information included in the transcription and the type of each type of confidential information). A machine learning algorithm may analyze the training data and produce an inferred function, which can be used for mapping new examples.

In some implementations, one or more of the above described techniques may be used to identify potential confidential information.

In some implementations, potential confidential information may be verified using various verification functions. For example, a potential credit card number may be checked using a checksum routine or potential addresses may be compared to a list of known addresses. Other verification methods may be used.

In some implementations, each piece of potential confidential information may include a measure of confidence, that is, a measure of the likelihood that the identified potential confidential information is actually confidential information. In some implementations, the measure of confidence may be compared to a threshold number to determine whether the system identifies the potential confidential information as confidential information.

In other implementations, all identified potential confidential information is identified as confidential information.

The confidential information identification service can generate a report of the identified confidential information including a start time and an end time for each piece of confidential information.

The report can be provided to an audio masking service 308.

The audio masking service may remove the segment of the audio recording. The audio masking service 308 may cut or silence the portion of the audio file that contains the confidential information. As discussed above, the audio masking service may identify a predetermined audio cue that indicates the type of confidential information that was removed from the audio file.

Figure 4:
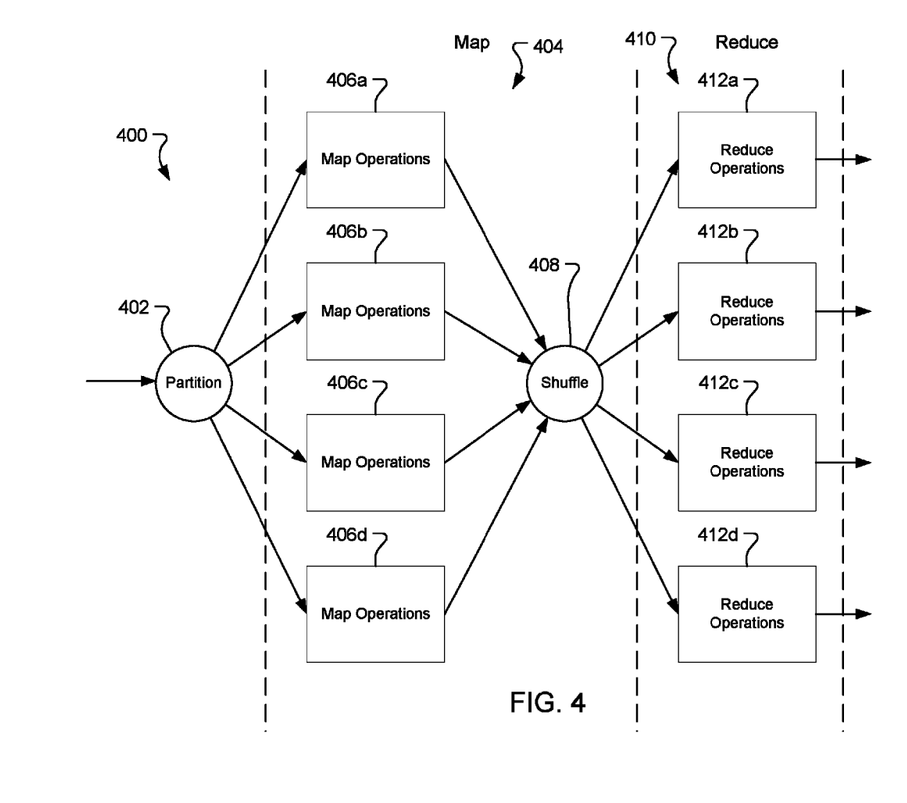
FIG. 4 illustrates a logical view of a map reduce application for processing data. Map Reduce is programming model for processing data in parallel.

FIG. 4 illustrates a logical view of a map reduce application 400 for processing data. Map Reduce is programming model for processing data in parallel. Generally Map Reduce processing involves breaking computations down into map operations and reduce operations. The map operation performs an operation on each of the records. A shuffle operation groups all of the values with the same key. The reduce operation performs an operation on the values that share the same key to combine the values in some manner.

The process may be performed in parallel by a large number of computing systems, referred to as a cluster. Client computers provide data to the cluster. Master node computers oversee the storing of data in a distributed file system, such as the Hadoop Distributed File System, and the parallel execution of map and reduce operations. Slave nodes perform the map and reduce computations of the data provided by the clients.

Data received by the application 400 is partitioned 402 among different map operations 404a-d. The data may be stored in a Hadoop Distributed File System (HDFS). The data may be broken down into smaller chunks or blocks and distributed throughout the map operations. For example, 100 gigabytes of data may be broken into 1 gigabyte chunks.

During the map phase, map operator 406a-d can be performed on the data. In general, each of the map operations 406a-d perform similar operations on different portions or chunks of the input data to produce intermediate data. The map phase can produce output records in the form of key-value pairs. The output record generally includes one key that acts as a primary key to identify the output record. Generally, the key in the key value pair acts as a primary key that is used to combine and consolidate records in the reduce phase.

In a shuffle phase, the data from the map operations may be sorted and repartitioned 408 to prepare for the reduce phase. The shuffle phase takes the key-value pairs produced by the map operations 406a-d and groups together all the key-value pairs with the same key. The shuffle phase then outputs each distinct key and all the values with that key to the reduce operations 412a-d.

During the reduce phase 410, data from the shuffle operation 408 are combined and consolidated. Output records produced from the reduce phase may be stored or processed by subsequent map phases.

An audio sanitation system may, for example, include map operations which perform each of the functions identified above with respect to FIG. 3. For example, the map reduce framework may receive sound recordings. Map operations may transcribe the audio, identify the confidential information, and mask the audio. In some implementations, each mechanism for identifying confidential information may use a separate map operation. In this manner, multiple map operations may act on the same transcription file in parallel, thereby reducing the amount of time required to process a sound recording.

Figure 5:
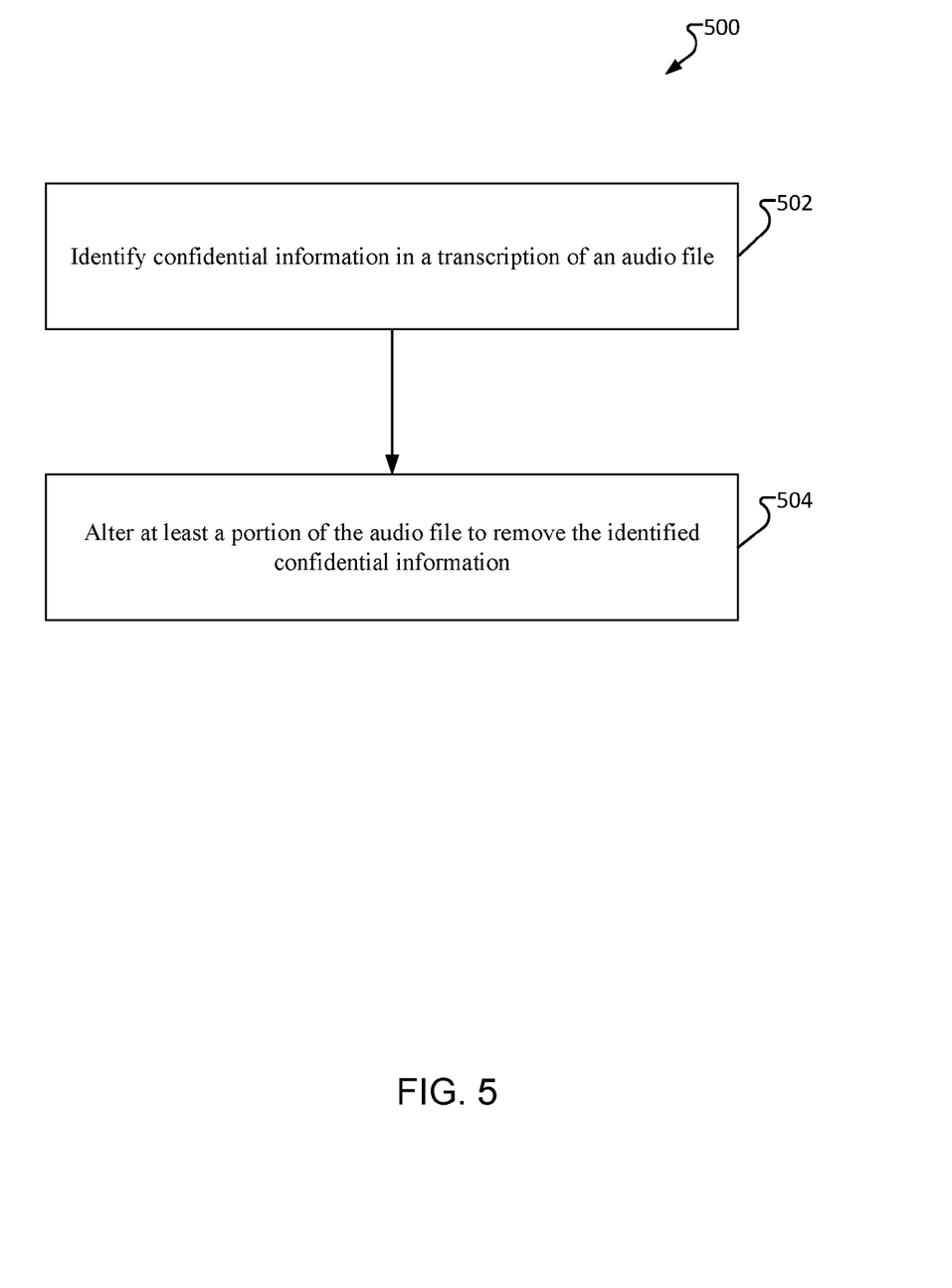
FIG. 5 is a flow chart of an example of a process for sanitizing audio files.

FIG. 5 is a flow chart of an example of a process for sanitizing audio files. The process may be performed by one or more computer systems operating sequentially or in parallel.

The process 500 identifies 502 confidential information in a transcription of an audio file. As discussed above, the transcription of the audio file may include time stamps that indicate the location of the each word in the transcription.

The process 500 alters 504 the audio file to remove the identified confidential information. In some implementations, the system may generate a new audio file that includes the contents of the original audio file except for the confidential information, for example, by selectively copying bits associated from the file from one file to another.

Embodiments of the subject matter and the functional operations described in this specification can be implemented in digital electronic circuitry, tangibly-embodied computer software or firmware, computer hardware (including the structures disclosed in this specification and their structural equivalents), or in combinations of one or more of them. Embodiments of the subject matter described in this specification can be implemented as one or more computer programs (i.e., one or more modules of computer program instructions encoded on a tangible non-transitory program carrier for execution by, or to control the operation of, data processing apparatus). The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry (e.g., an FPGA (field programmable gate array) or an ASIC (application-specific integrated circuit)). In addition to hardware, the apparatus can optionally include code that creates an execution environment for computer programs (e.g., code that constitutes processor firmware, a protocol stack, a database management system, an operating system, or a combination of one or more of them).

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document, in a single file dedicated to the program in question, or in multiple coordinated files (e.g., files that store one or more modules, sub-programs, or portions of code)). A computer program can be deployed so that the program is executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry (e.g., an FPGA (field programmable gate array) or an ASIC (application-specific integrated circuit)).

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks), however, a computer need not have such devices. Moreover, a computer can be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), to name just a few).

Computer-readable media suitable for storing computer program instructions and data include all forms of nonvolatile non-transitory memory on media and memory devices, including by way of example semiconductor memory devices (e.g., EPROM, EEPROM, and flash memory devices), magnetic disks (e.g., internal hard disks or removable disks), magneto-optical disks, and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback) and input from the user can be received in any form, including acoustic, speech, or tactile input. In addition, a computer can interact with a user by sending documents to and receiving documents from a device that is used by the user, for example, by sending web pages to a web browser on a user's device in response to requests received from the web browser.

Embodiments of the subject matter described in this specification can be implemented in a computing system that includes a back-end component (e.g., as a data server), or that includes a middleware component (e.g., an application server), or that includes a front-end component (e.g., a client computer having a graphical user interface or a web browser through which a user can interact with an implementation of the subject matter described in this specification), or any combination of one or more such back-end, middleware, or front-end components. The components of the system can be interconnected by any form or medium of digital data communication (e.g., a communication network). Examples of communication networks include a local area network (LAN) and a wide area network (WAN) (e.g., the Internet).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML, page) to a user device (e.g., for purposes of displaying data to and receiving user input from a user interacting with the user device), which acts as a client. Data generated at the user device (e.g., a result of the user interaction) can be received from the user device at the server.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying FIGS. do not necessarily require the particular order shown, or sequential order, to achieve desirable results. In some cases, multitasking and parallel processing may be advantageous.

What is claimed is:

1. A computer-implemented method for sanitizing digital audio recordings, the method comprising:
    identifying confidential information in a transcription of an audio file; and
    altering at least a portion of the audio file to remove the identified confidential information, comprising:
        identifying a type of confidential information in the audio file;
        obtaining an audio cue that identifies with the type of confidential information; and
        replacing the confidential information in the audio file with the audio cue that identifies the type of confidential information that was replaced.

2. The computer-implemented method of claim 1, further comprising transcribing the audio file.

3. The computer-implemented method of claim 1, wherein identifying the confidential information comprises applying at least one regular expression to the transcription.

4. The computer-implemented method of claim 1, wherein altering at least a portion of the audio file comprises removing the confidential information from the audio file.

5. A non-transitory computer storage medium encoded with computer program instructions that when executed by one or more computers cause the one or more computers to perform operations comprising:
    identifying confidential information in a transcription of an audio file; and
    altering at least a portion of the audio file to remove the identified confidential information, comprising:
        identifying a type of confidential information in the audio file;
        obtaining an audio cue that identifies with the type of confidential information; and
        replacing the confidential information in the audio file with the audio cue that identifies the type of confidential information that was replaced.

6. The non-transitory computer storage medium of claim 5, further comprising transcribing the audio file.

7. The non-transitory computer storage medium of claim 5, wherein identifying the confidential information comprises applying at least one regular expression to the transcription.

8. The non-transitory computer storage medium of claim 5, wherein altering at least a portion of the audio file comprises removing the confidential information from the audio file.

9. A system comprising:
one or more computers and one or more storage devices storing instructions that are operable, when executed by the one or more computers, to cause the one or more computers to perform operations comprising:
identifying confidential information in a transcription of an audio file; and
altering at least a portion of the audio file to remove the identified confidential information, comprising:
identifying a type of confidential information in the audio file;
obtaining an audio cue that identifies with the type of confidential information; and
replacing the confidential information in the audio file with the audio cue that identifies the type of confidential information that was replaced.

10. The system of claim 9, further comprising transcribing the audio file.

11. The system of claim 9, wherein identifying the confidential information comprises applying at least one regular expression to the transcription.

12. The system of claim 9, wherein altering at least a portion of the audio file comprises removing the confidential information from the audio file.

* * * * *

UNITED STATES PATENT AND TRADEMARK OFFICE
CERTIFICATE OF CORRECTION

PATENT NO. : 10,002,639 B1  
APPLICATION NO. : 15/620044  
DATED : June 19, 2018  
INVENTOR(S) : Michael Joseph Gaeta et al.

Page 1 of 1

It is certified that error appears in the above-identified patent and that said Letters Patent is hereby corrected as shown below:

On the Title Page

Column 1 (Notice:), Line 3, after 0 days. delete "days."

Signed and Sealed this
Fourth Day of September, 2018

Andrei Iancu
*Director of the United States Patent and Trademark Office*